United States Patent

[11] 3,568,104

[72] Inventor Francis M. Bailey
  Roanoke, Va.
[21] Appl. No. 785,520
[22] Filed Dec. 20, 1968
[45] Patented Mar. 2, 1971
[73] Assignee General Electric Company

[54] SONIC DELAY LINE DEVICE
  5 Claims, 2 Drawing Figs.

[52] U.S. Cl.................................. 333/30,
  328/56, 340/347, 340/313, 340/348, 179/18
[51] Int. Cl...................................... H03h 9/30,
  H03k 13/00
[50] Field of Search....................... 333/29;
  340/173 (MS), 174 (MS), 167 (B), 191, 345, 404,
  347, (Inquired); 328/56 (Inquired); 310/8.1, 8.3;
  307/106; 333/30; 179/100.2 (CH), 100.4 (MS), 84

[56] References Cited
UNITED STATES PATENTS
2,907,958 10/1959 Skaggs......................... 333/30
3,020,496 2/1962 Feuerstein et al. ........... 333/30
3,025,479 3/1962 Wolfskill...................... 333/30
3,264,583 8/1966 Fitch............................ 333/30
3,277,404 10/1966 Fabian......................... 333/30

Primary Examiner—Herman Karl Saalbach
Assistant Examiner—Paul L. Gensler
Attorneys—John B. Sponsler, Gerald R. Woods, James C. Davis, Jr., Frank L. Neuhauser, Oscar B. Waddell, Melvin M. Goldenberg and Arnold E. Renner ABSTRACT: A multifaced rod of acoustical transmitting material, for use with an object identifying apparatus, has attached to one of its ends a piezoelectric element. Preselected faces of the rod are at spaced intervals, slotted, or notched, perpendicular to the axis of the rod and to the face in which they are cut. An acoustical wave produced by the piezoelectric element in response to an electrical signal is reflected by each of the notches in turn. The resulting echoes are received by the piezoelectric element which in response thereto produces a coded representation of the identity of the object to be identified.

PATENTED MAR 2 1971  3,568,104

INVENTOR.
FRANCIS M. BAILEY

3,568,104

SONIC DELAY LINE DEVICE

BACKGROUND OF THE INVENTION

In the identification of objects one type of apparatus utilizes a piezoelectric element to produce an acoustical wave in a delay line or the like to which it is attached. The acoustical wave propagates through the delay line and is reflected from fixed deformities in the line. The deformities are at predetermined spaced linear intervals in the line so that the acoustical wave is reflected by the deformities in the order in which the deformities occur. Depending on the combination of the placement of the deformities a code is formed which representative of the identity of that particular delay line, or the object to which it is attached.

At times it may be necessary to change the indentity of the object, or to identify new objects, in which case a change in the obstructions is required. In some of the identification apparatus the delay line needs to be entirely replaced by a delay line which is coded in the manufacturing plant. Other types utilize clamps which are attached at measured increments whereby an echo is provided. These special clamps must therefore be stocked. Some other types of identification apparatus depend on the frequency of the piezoelectric element to identify the object. Recoding of this type requires replacement of the piezoelectric element or the entire identification apparatus. In either of the examples it is necessary that a stock of replacement units is on hand for the purpose of coding and recoding of the various objects to be identified.

SUMMARY OF THE INVENTION

The present invention relates to a simplified arrangement having a multifaced, solid rod attached at one end to a piezoelectric element. Notches, or slots, are cut in each of a number of selected faces positioned a predetermined distance from the piezoelectric element so that an acoustical wave produced thereby is reflected from each of the slot and returned to the piezoelectric element in an order corresponding to a predetermined coding. Coding, or recoding, of this kind of device is relatively simple, and can be accomplished in the field with simple tools; e.g., a saw.

DETAILED DESCRIPTION

Figure 1:
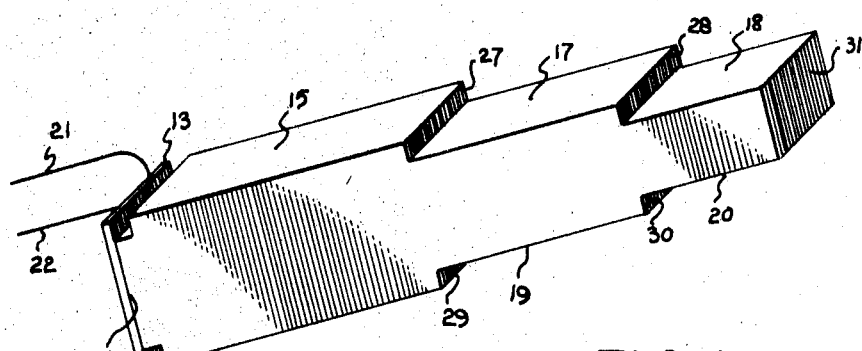
FIG. 1 shows a reflection apparatus for the purpose of explanation of the principle.

Referring to FIG. 1 wherein a piezoelectric transponder 13 is rigidly attached to the base 14 of a rod or column 15 made of an acoustically conductive material, such as metal or plastic, which has a series of reductions 17—20 along the axis perpendicular to the base 14. The reductions are on opposite sides and cause a series of surfaces 27—30 to be formed which are parallel to base 14; i.e., perpendicular to the axis of the rod 15. The end 31 opposite the base 14 is perpendicular to the axis of the rod 15.

Figure 2:
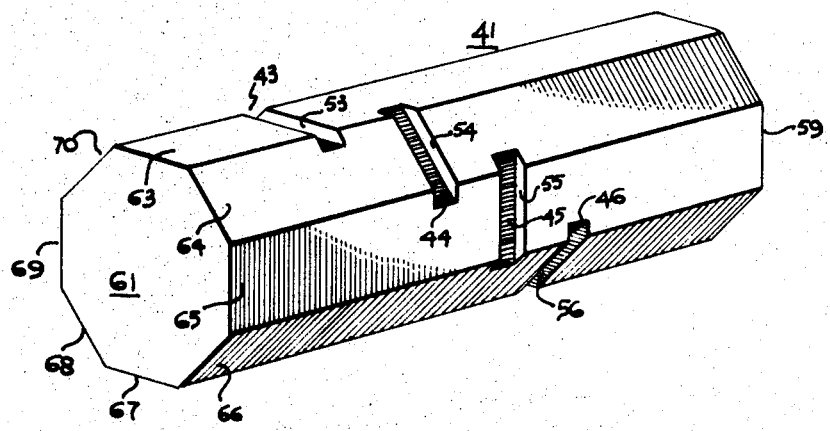
FIG. 2 shows an acoustical rod coded for use in an identification apparatus.

The transponder 13 is provided with two electrical connections 21 and 22 which are normally connected to an alternating current supply source (not shown), whereby the transponder is intermittently caused to vibrate at the frequency of the A.C. supply source (not shown). Due to the physical arrangement between the transponder 13 and the base 14 of the rod 15, these vibrations are transferred to the rod 15 where they propagate through the material along the entire axis of the rod. Upon reaching the end 31 some of the vibrations are returned to their origin, transponder 13. Similarly the perpendicular surfaces 27—30 cause some of the vibrations to be "reflected" to the transponder 13. The transponder subjected to these acoustical vibrations produces electrical impulses in response thereto. The first resultant impulse occurs when the first acoustical wave reflected from the perpendicular surfaces 27 and 29 reaches the transponder 13. A second impulse is produced by the reflected acoustical wave from the perpendicular surfaces 28 and 30, and a third impulse occurs when the reflected acoustical wave from end surface 31 reaches the transducer. The elapsed time between the impulses depends on the distance between the transponder and the perpendicular surfaces 27—31 and the acoustical properties of the material used. These properties also determine the number of perpendicular surfaces and consequently the number of impulses which may be expected to be reflected, due to the attenuation of the material which determines the maximum length of the bar 15. For example, a bar made of plastic having a relatively high attenuation is limited to conditions where relatively few impulses are needed, while brass when used will allow a more extensive number of reflections or echoes to be transmitted. The transducer 13 operates as a transmitter first by producing an acoustical signal, and then as a receiver for converting the acoustical echoes of that signal to a number of electrical impulses corresponding to the number of perpendicular surfaces 27—30 present in the rod 15. In FIG. 2 an octagonal column or rod 41, having a base 59 to which a piezoelectric transponder (not shown) is rigidly attached, has a second surface 61 parallel thereto at the opposite end of the rod. The eight faces 63—70 joining the base 59 and the end 61 are each provided with a slot of which 43—46 are shown to be located in faces 63—66, respectively. As previously pointed out, these slots may be fabricated upon the various faces according to a predetermined coding, or the slots may be manually cut into the faces at appropriate locations when the device is recoded, or replaced in the field. Perpendicular surfaces 53—56, which correspond to surfaces 27—30 in the column in FIG. 1, are formed by each of the slots 43—46, respectively. The echoes derived from the acoustical wave produced by the piezoelectric transponder (not shown) which is reflected from the perpendicular surfaces 53—46 are received by the transponder and converted to electrical signals thereby.

In practice some of the sides 63—70 are not notched, so that under those conditions no echo is received by the transponder due to the absence of vertical surfaces and no electrical signal is developed, resulting in a code corresponding to the placement of notches appearing in the octagonal bar 41.

I claim:

1. A sonic coding apparatus comprising:
    a. a transducer for producing a sonic impulse and for producing a signal in response to a reflected impulse; and
    b. an elongated member of sonic transmitting material attached to said transducer, said member having a series of deformities spaced along the length thereof, said deformities serving to produce a series of reflected impulses for actuating said transducer to produce a coded output corresponding to the number of deformities.

2. The invention claimed in claim 1 wherein said transducer is a piezoelectric crystal.

3. The invention claimed in claim 1 wherein the sequential order of said coded output is proportional to the distance between said transducer and said deformities.

4. The invention claimed in claim 1 wherein said elongated member is of polygonal cross section, and said deformities are disposed along selected sides of said member so that each one of a predetermined number of said sides contains one of said deformities.

5. The invention claimed in claim 4 wherein said deformities are indentations traversing the sides of said elongated member substantially perpendicular to the longitudinal axis.